United States Patent Office 3,175,021
Patented Mar. 23, 1965

3,175,021
PRODUCTION OF 2-METHYL-2-PENTENE
Robert D. Vanselow, Berkeley, and John B. Wilkes, Albany, Calif., assignors to California Research Corporation, San Francisco, Calif., a corporation of Delaware
No Drawing. Filed Sept. 15, 1961, Ser. No. 138,250
5 Claims. (Cl. 260—683.15)

This invention relates to a process for the production of 2-methyl-2-pentene by a catalyzed dimerization of propene. More particularly, it relates to the dimerization of propene in the presence of potassium metal disposed upon anhydrous high surface area alumina.

It is known to produce 2-methyl-2-pentene by the dimerization of propene in the presence of sodium metal disposed upon adsorbent carbon. It is also known that propene dimerization catalyzed by sodium disposed on alumina is a low conversion reaction and that the sodium catalyst rapidly deactivates under reaction conditions. Surprisingly, it has now been found that although potassium metal is well known for its greater chemical reactivity than sodium metal, as evidenced by its higher oxidation-reduction potential and the like, potassium metal disposed upon specific alumina support materials are excellent propene dimerization catalysts useful for the production of 2-methyl-2-pentene, and that these catalysts are capable of prolonged catalyst life. Thus, the closely related alkali metals perform quite differently in propene dimerization, and certain variations in the nature of the support material, for example, surface area differences, have profound and unpredictable effects upon the nature of the resulting products.

It has now been found that 2-methyl-2-pentene may be produced at elevated temperatures and pressures by contacting propene with potassium metal disposed upon high surface area substantially anhydrous alumina. By high surface area alumina is meant alumina having surface areas greater than about 25 square meters per gram of material. Aluminas having surface areas in the range from 50 to 500 square meters per gram are particularly desirable; still more desirable are aluminas having surface areas in the 100 to 400 square meter range. By substantially anhydrous alumina is meant alumina which has been freed of bound or adsorbed water to the extent which is comparable to that degree of dehydration which is achieved by heating boehmite at about 800° F. for a period of 2–4 hours, preferably for the longer periods. Higher heating temperatures may be employed for relatively shorter periods, except that heating for appreciable periods in the alumina sintering temperature range, e.g., about 1700–2300° F. and higher, serves to undesirably reduce the surface area of the aluminas.

The reaction is generally conducted in a system which for all practical purposes is free of molecular oxygen, and at temperatures in the range from about 150° to 400° F., and higher, and at elevated pressures ranging up to 3000 p.s.i.g. and higher, with the preferred operation being conducted in the range from about 150 to 1500 p.s.i.g. The duration of the contacting may vary from a few tenths of a second to as much as twenty hours, depending upon whether the process is continuous or batch.

Not all alumina support materials are satisfactory for use in the present process. Aluminas having surface areas below about 25 square meters per gram, aluminas which have not been thoroughly dried, and aluminas containing even relatively small amounts of heavy metal oxides, such as those of chromium, iron, nickel, and molybdenum, and the like, are wholly unsatisfactory. Similarly, aluminas containing appreciable amounts of silica or related materials, and which have the high "acid" activities, well-known in synthetic high molecular weight hydrocarbon cracking art are also unsatisfactory. Potassium is one of the strongest base metals, yet, rather than neutralize undesirable acid characteristics of such a support, the potassium metal appears to enhance acid activity and promote undesirable skeletal isomerizations and cracking. High purity commercial grade aluminas, e.g., 99+% $Al_2O_3$, may be used as the support material, or the alumina may be prepared by well-known art methods such as by alumina trihydrate (gel) precipitation in the presence of aqueous ammonia or aqueous alkali followed by water washing and dehydration, as noted above, and the like. An especially satisfactory alumina support substantially free of strongly acidic catalyst sites may be obtained by immersing a previously dried alumina in a dilute aqueous alkaline solution of potassium carbonate, hydroxide, oxalate, or the like, and then dehydrating the treated support material at elevated temperatures before disposition thereon of the potassium metal.

The high surface area substantially anhydrous alumina useful in the process of the present invention may vary in size from near colloidal dimensions to pellets of macro dimensions, depending upon the reaction system to be used. For example, in a slurry system, excellent results are obtainable where the support is particulate matter having a diameter of the order of about 200 microns and even smaller. For fixed bed operations, it is preferred that the alumina be from about 2 to 10 millimeters and larger in diameter.

Various methods may be used for the disposition of the active component on the alumina support. The metal in the molten state may be contacted by mechanical means with the support under an inert atmosphere, such as nitrogen. The metal in the form of its vapor may also be contacted with and disposed upon the support material in an inert atmosphere. Surprisingly, and very conveniently, for reasons of safety, undispersed molten potassium metal in the presence of an inert hydrocarbon medium, under conditions of high speed stirring (e.g., 10,000 r.p.m. and higher) readily wets and adheres to alumina, and thus greatly reduces the hazard of flash fires caused by accidental contact of the catalyst with atmospheric oxygen. Suitable inert normally liquid hydrocarbon media include saturated aliphatic hydrocarbons, mono-olefinic aliphatic hydrocarbons, and non-conjugated poly-olefinic aliphatic hydrocarbons. Inert aromatic hydrocarbons may also be used as media in catalyst preparation, but these are generally avoided, because most aromatic hydrocarbons are not inert to the catalyst under propene dimerization conditions.

The amount of disposed potassium required to produce an active catalyst varies. In terms of parts by weight of support material, at least about 0.01 part of potassium metal is necessary to produce an active catalyst, while as much as about 0.5 part of potassium metal may be used where the support particle size is of the order of 200 microns or less. For the larger support particle sizes, the amount of potassium which may be used may vary from about 0.01 to about 0.2 part. The use of somewhat larger amounts of potassium metal causes the catalyst to coalesce, and therefore results in an unsatisfactory catalyst.

While potassium is indicated as the active material which is placed upon the support to yield a dispersed potassium on alumina catalyst system, it should be recognized that the active component may also exist in the form of the alkali metal hydride or an organo-metallic derivative. Thus, part or all of the potassium metal may be present in the catalyst composition in the form of the alkali metal hydride, and/or as an organo-metallo material such as allyl, cyclohexyl, propyl, amyl, and similar alkyls of potassium.

The following examples are intended to be illustrative of the invention herein described but it is not intended that the examples be limiting as to the invention herein described.

EXAMPLES NOS. 1–9

The data listed in Table I, following, was obtained from experiments run in a stainless steel catalyst testing unit in a continuous operation using a fixed bed catalyst system under the conditions indicated. The alumina support material had a surface area of 385 square meters per gram, was 99+% pure $\gamma$-$Al_2O_3$, and was sized to pass a 100 mesh sieve. It was dried in an anhydrous high purity nitrogen gas stream by heating it at a temperature of about 1300° F. for about eight hours. All further treatments, transfers, and the like, were accomplished under inert nitrogen atmosphere. The propene was 95%+ pure and was thoroughly dried before use.

*Table I*

| Example No. | 1 | 2 | 3 | 4 | 5 | 6 | 7 | 8 | 9 |
|---|---|---|---|---|---|---|---|---|---|
| Catalyst: Potassium, Wt. percent of Support | ¹ 5 | ² 5 | (³) | (³) | (³) | (³) | ⁴ 10 | ⁵ 5 | ⁶ 10 |
| Conditions: | | | | | | | | | |
| Temp., ° F | 265 | 255 | 248 | 180 | 295 | 249 | 252 | 252 | 252 |
| Pressure, p.s.i.g | 915 | 935 | 905 | 920 | 905 | 910 | 900 | 900 | 920 |
| Time LHSV | 0.47 | 0.37 | 1.07 | 1.08 | 1.09 | 1.04 | 1.04 | 1.05 | 1.02 |
| Conversion, Wt. percent | 86 | 91 | 51 | 12 | 67 | 34 | 82 | 46 | 70 |
| Yield: | | | | | | | | | |
| Dimer, Wt. percent | 86.2 | 82.6 | 89.5 | 99 | 81.9 | 94.4 | 87.2 | 90.7 | 95.9 |
| $C_7H_{14}$ and higher | 13.8 | 17.4 | 10.5 | 1.0 | 18.1 | 5.6 | 12.8 | 9.3 | 4.1 |
| Dimer Composition, percent: | | | | | | | | | |
| 4-M-1-pentene | 0.9 | 0.9 | 0.9 | 1.4 | 1.2 | 0.9 | 1.0 | 0.9 | 0.9 |
| 2-M-2-pentene | 68.0 | 65.5 | 65.9 | 68.8 | 63.9 | 66.4 | 67.5 | 65.9 | 68.6 |
| Other | 31.1 | 33.6 | 33.2 | 29.8 | 34.9 | 32.7 | 31.5 | 33.2 | 30.5 |

¹ 20.5 g. of potassium stirred with 500 ml. (400 g.) of alumina under dry nitrogen for 3 hours at 300°–360° F. followed by heating in vacua at 500° F. for 4 hours.
² Prepared like (¹) except heated at 650° F. rather than 500° F.
³ Used catalyst from preceding example.
⁴ Prepared like (²) except 41 g. of K. rather than 20.5 g.
⁵ Prepared like (²) except heated 25 hours rather than 4 hours.
⁶ Prepared like (¹) except alumina was presoaked with a 0.14 M $K_2CO_3$ alkaline solution and dried at 1,300° F.

From the foregoing data it is to be noted that potassium metal supported upon high surface area anhydrous alumina is an excellent catalyst system for the dimerization of propene for the production of 2-methyl-2-pentene. Effective reaction temperatures are seen to be as low as 180° F., and even lower, and range upward to as high as 300° F., and higher. From a comparison of the catalyst preparation and run data of comparable Examples 8 and 9, it is also to be noted that treatment of the catalyst support material with aqueous alkali such as potassium carbonate, and the like, reduces by more than 50% the formation of undesirable polymer product having molecular weights in excess of the desired propene dimer.

EXAMPLE 10

Potassium metal was disposed upon substantially anhydrous alumina having a surface area less than 1 square meter per gram and a series of experiments conducted at temperatures ranging from 254° F. to as high as 310° F. at pressures from 301 p.s.i.g. to 900 p.s.i.g. and at liquid hourly space velocities ranging from 0.171 to 0.378. Under these conditions, conversions of propene varied from 7.6% to 39.6%. In every case, while the yield of dimer was 92.7% or higher, the amount of 2-methyl-2-pentene produced was only a mere trace up to less than a few percent. These experiments showed that low surface area dried alumina is wholly unsatisfactory as support material for potassium metal as a catalyst system for the production of 2-methyl-2-pentene by the dimerization of propene.

In the dimerization of propene, according to the process of the present invention, the disposed potassium-alumina catalysts are effective for periods of operation for as much as 50 hours and even longer, and may produce as much as 75 to 100 pounds of dimer per pound of potassium used. In direct contrast, sodium metal disposed upon anhydrous aluminas were generally inactive propene dimerization catalysts. Trace propene dimerization activity was noted for sodium disposed upon dried kappa-alumina, but although as much as 9 weight percent of sodium (based upon weight of support used) was used to prepare the catalyst, at 300° F., 1200 p.s.i.g. pressure, and 15 hours reaction time, only a trace amount of dimer was recovered. Similar results were obtained using smaller amounts of sodium on kappa-alumina. When 13 weight percent of sodium was disposed upon $\alpha$-alumina, no detectable propene dimerization occurred. On the other hand, potassium disposed upon anhydrous $\alpha$-, kappa-, and gamma-aluminas were found to be effective propene dimerization catalyst systems.

EXAMPLES NOS. 11–16

Except for Example 4 (see Table I), the data listed in the following table was obtained in batch runs carried out in a 630 cc. rocking autoclave using from 30 to 60 cc. of catalyst, 135–145 g. of 96% propene, and 100 cc. of refined white oil. The alumina in every case was 99+% pure, and in some instances was sintered at temperatures in the range from about 1900°–2300° F. in order to vary the surface areas. The reaction temperature was maintained at 300° F. and the reaction continued until one-half of the propene had reacted as indicated by the pressure drop in the autoclave, e.g., from about 1200 p.s.i.g. initial pressure to about 600 p.s.i.g. final pressure.

The surface areas listed were obtained by the BET method (H. Brunauer, P. H. Emmett and E. Teller), JACS 60, 309 (1938).

*Table II*

ALUMINA SURFACE AREA AND 2-METHYL-2-PENTENE PRODUCTION

| Example No. | 11 | 12 | 13 | 14 | 15 | 16 | 4 |
|---|---|---|---|---|---|---|---|
| Surface Area $M^2/g$ | 1 | 19 | 0.5 | 13 | 45 | 33 | 385 |
| Particle Diameter, mm | 3 | 0.2 | 0.5 | 0.5 | 3 | 3 | .5 |
| Product Distribution, percent: | | | | | | | |
| 2-M-2-pentene | Trace | Trace | Trace | 3.7 | 72 | 48 | 68.8 |
| Other | 100 | 100 | 100 | 96.3 | 28 | 52 | 31.2 |

From the data of Table II, above, it is to be seen that the product distribution obtained from the anhydrous alumina-supported potassium catalyzed propene dimerizations depends upon the surface area of the support material. Thus, high surface area aluminas, e.g., aluminas having a surface area above about 25 square meters per gram, yield a product which is substantially 2-methyl-2-pentene, whereas low surface area alumina supports yield a propene dimerization catalyst which produce only trace or slightly larger amounts of 2-methyl-2-pentene.

In addition to the foregoing unexpected participation of the supporting alumina in the determination of the product in the potassium catalyzed dimerization of propene, the alumina-supported potassium metal catalysts having surface areas in the range of about 100–400 square meters per gram dimerize propene from 20 to 40 times faster than the known potassium catalyst systems, such as potassium supported by potassium carbonate, and the like.

As will be evident to those skilled in the art, various modifications in this process can be made or found in the light of the foregoing disclosures and discussions without departing from the spirit and scope of the disclosures or from the scope of the claims.

We claim:
1. Process for the production of 2-methyl-2-pentene which comprises contacting propene at elevated pressures and at a temperature in the range from about 150° to 400° F. with a dimerization catalyst consisting essentially of potassium metal disposed upon a substantially anhydrous alumina having surface area greater than 25 square meters per gram and producing a reaction mixture containing 2-methyl-2-pentene.

2. The process of claim 1, wherein said alumina has a surface area from about 50 to 500 square meters per gram.

3. The process of claim 1, wherein said dimerization catalyst contains from about 0.01 to about 0.5 part of potassium metal per part of said alumina.

4. The process of claim 1, wherein said contacting is at a pressure in the range from about 150 to 1500 p.s.i.g.

5. The process of claim 1, wherein said alumina is dehydrated, contacted with a dilute aqueous alkali solution, and redried at elevated temperatures.

References Cited by the Examiner

UNITED STATES PATENTS

| | | | |
|---|---|---|---|
| 2,881,234 | 4/59 | Esmay et al. | 260—683.15 |
| 2,952,719 | 9/60 | Appell | 260—683.15 |

FOREIGN PATENTS

| | | |
|---|---|---|
| 868,945 | 5/61 | Great Britain. |

ALPHONSO D. SULLIVAN, *Primary Examiner.*